(12) United States Patent
Baumann et al.

(10) Patent No.: US 8,939,277 B2
(45) Date of Patent: Jan. 27, 2015

(54) METHOD FOR CONVEYING SILICON GRANULES IN AN ENCAPSULATED CONVEYING CHANNEL

(75) Inventors: Bernhard Baumann, Emmerting (DE); Norbert Ellinger, Postmuenster (DE); Gerhard Forstpointner, Kastl (DE)

(73) Assignee: Wacker Chemie AG, Munich (DE)

( * ) Notice: Subject to any disclaimer, the term of this patent is extended or adjusted under 35 U.S.C. 154(b) by 983 days.

(21) Appl. No.: 12/844,218

(22) Filed: Jul. 27, 2010

(65) Prior Publication Data

US 2011/0024266 A1     Feb. 3, 2011

(30) Foreign Application Priority Data

Jul. 31, 2009    (DE) .................... 10 2009 028 166

(51) Int. Cl.
*B65G 35/00*      (2006.01)
*B65G 27/24*      (2006.01)

(52) U.S. Cl.
CPC ..................................... *B65G 27/24* (2013.01)
USPC .................... 198/619; 198/617; 198/752.1

(58) Field of Classification Search
USPC .............................. 198/617, 619, 750.1, 752.1
See application file for complete search history.

(56) References Cited

U.S. PATENT DOCUMENTS

| | | | |
|---|---|---|---|
| 5,462,010 A | 10/1995 | Takano | |
| 5,718,581 A * | 2/1998 | Fernwood et al. | 433/88 |
| 5,984,677 A * | 11/1999 | Fernwood et al. | 433/88 |
| 6,375,011 B1 | 4/2002 | Flottmann | |
| 6,609,870 B2 | 8/2003 | Williams | |
| 6,860,158 B2 * | 3/2005 | Bitto et al. | 73/861.355 |
| 2006/0140786 A1 * | 6/2006 | Kawasaki | 417/313 |
| 2009/0045135 A1 * | 2/2009 | Khudenko et al. | 210/631 |
| 2009/0078029 A1 * | 3/2009 | Matsusaka et al. | 73/54.41 |

FOREIGN PATENT DOCUMENTS

| | | |
|---|---|---|
| CN | 2035347 U | 4/1989 |
| CN | 2083571 U | 8/1991 |
| EP | 0 537 988 A1 | 4/1993 |
| EP | 1043249 A1 | 10/2000 |
| GB | 1162989 A | 9/1969 |
| JP | 62-70667 U | 5/1987 |
| JP | 3-146179 A | 6/1991 |
| JP | 5-105575 A | 4/1993 |
| JP | 9142631 A | 6/1997 |

* cited by examiner

*Primary Examiner* — Joseph Dillon, Jr.
(74) *Attorney, Agent, or Firm* — Brooks Kushman P.C.

(57) ABSTRACT

Silicon granules are conveyed in an encapsulated conveying channel by swaying movement of the channel produced by a permanent magnet excited by an external alternating electromagnetic field.

15 Claims, 2 Drawing Sheets

METHOD FOR CONVEYING SILICON GRANULES IN AN ENCAPSULATED CONVEYING CHANNEL

CROSS-REFERENCE TO RELATED APPLICATIONS

This application claims priority to German Patent Application No. DE 10 2009 028 166.5 filed Jul. 31, 2009 which is herein incorporated by reference.

BACKGROUND OF THE INVENTION

1. Field of the Invention

The invention relates to a method for conveying silicon granules in an encapsulated conveying channel.

2. Background Art

In the production of polycrystalline silicon granules in a fluidized bed reactor it is necessary, over the course of the process, to meter silicon material into the reactor at regular intervals or continuously and elsewhere to remove finished granules from the reactor.

Simple open-closed fittings such as slides, for example, are usually used for this purpose in production. In order to preclude contamination of the high-purity silicon, slides composed of silicon material are generally used in this case. What is disadvantageous, in this case, however, is the high degree of wear of the slides, resulting from the abrasiveness of silicon granules. For this reason, therefore, these fittings have to be replaced in a short cycle.

A further disadvantage of the slides is a tendency toward blockage. In this case, the respective apparatus has to be shut down in order to manually eliminate the blockage in the fitting. Moreover, only limited regulation of the metering and extraction amounts can be achieved by means of the simple open-closed control.

Open and closed conveying channels with a direct coupling-in by means of electric or pneumatic vibration motors are usually used in the art for conveying bulk materials.

In the production of silicon single crystals, the loading and the recharging of a melting crucible with high-purity silicon material have to be carried out under a vacuum atmosphere for purity reasons.

U.S. Pat. No. 5,462,010 discloses a device for continuously conveying granular polysilicon into the melting crucible. The arrangement comprises a complex delivery system comprising a large holding container, an intermediate container and the main container, which is seated on a vibration drive. The entire system is housed in a common vacuum chamber. What is disadvantageous about this arrangement is the vibration drive, which is controlled externally in a complicated manner and which fosters losses of tightness in the system owing to the required perforations for electrical supply lines and controls. As a result of the high frequencies required to move the silicon material, high abrasiveness comes into question. Since the high-purity silicon granules in that case come into contact with many different materials (measuring probes, etc.), increased contamination of the material is also a concern.

U.S. Pat. No. 6,609,870 discloses a method for conveying granular silicon by means of a pneumatic device. In that case, the system is fitted in a closed system under a vacuum. The aim of this system is also to remove dust particles from the granules by means of the air flow. What is disadvantageous about the system, however, is that it is an open system wherein it is necessary constantly to add a high-purity gas as transfer medium, which is then contaminated with dust during transport.

In the production of polysilicon granules in a fluidized bed reactor, the reactor with its addition and extraction lines constitutes a closed system, by contrast, which generally operates with a design pressure of up to 10 bar excess pressure. For this reason, known vibrating conveying channels with an electric or pneumatic vibration motor which couple in directly at the vibrating channel cannot be used.

SUMMARY OF THE INVENTION

The object of the invention, therefore, was to provide a novel system and a method for conveying silicon granules wherein the device can be housed in the pressure space without direct external connection and wherein no large vibration movements act on the granules, in order to prevent abrasion of the granules and of the mechanical parts. Furthermore, the intention is to enable the system to be fitted outside the reactor conveniently with respect to maintenance, in order to facilitate possible access. These and other objects are achieved by imparting a swaying movement to the conveying device through the interaction of a permanent magnet with an external magnetic field produced by coils located outside the enclosed conveying apparatus.

DETAILED DESCRIPTION OF THE PREFERRED EMBODIMENTS

Figure 1:
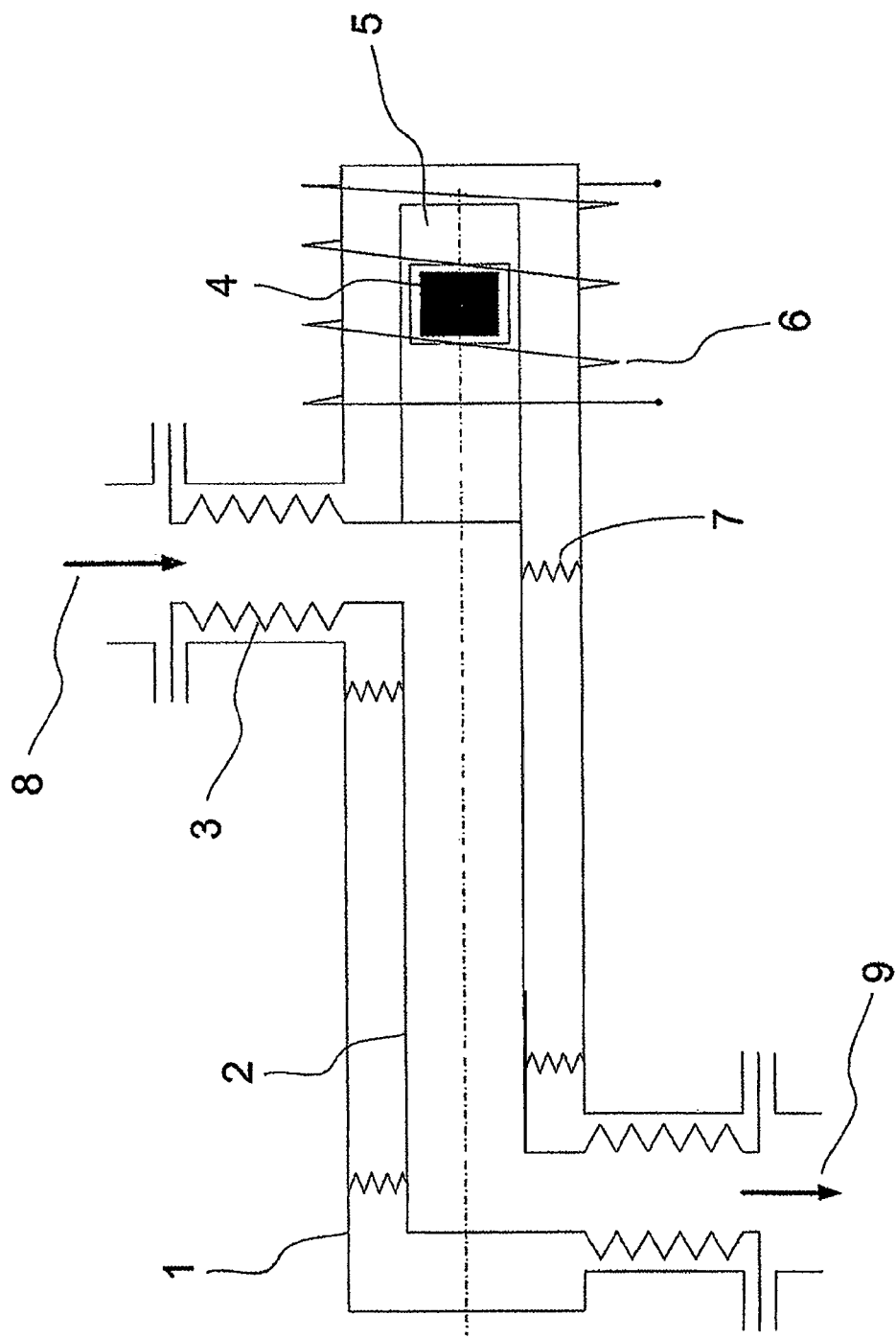
FIG. 1 illustrates one embodiment of the invention.

The invention thus relates to a method for conveying granulated silicon by means of horizontal and/or vertical movement of the conveying device, characterized in that the conveying device is completely encapsulated with respect to the outside and the forward movement of the granules is produced by a swaying movement of the conveying device by means of the excitation of at least one permanent magnet fitted to the conveying device by an electromagnetic field, the electromagnetic field being applied to the encapsulated device by a coil arranged outside the pressure space.

By comparison with conveying channels which are excited by means of vibration motors, the shaking movement in the method according to the invention is effected in the encapsulated conveying channel by the swaying movement of a permanent magnet excited by an external alternating electromagnetic field. As a result, the conveying device can be completely encapsulated toward the outside in a housing and does not require any bushings for electrical supply lines or compressed air lines.

The conveying device for the method according to the invention has toward the outside at least two connection possibilities, preferably one in each case at each side of the conveying channel as inlet and outlet. These connections are preferably embodied as connectors or flange connections in order to connect the conveying device in a pressuretight fashion to a pipeline, a reactor or a container for storing granules. As a result, the device can be used for example as a certified pressure unit in a fluidized bed apparatus for producing polysilicon.

The conveying device can be operated in a vacuum or with elevated pressure, depending on the design of the components. The method is preferably performed at a pressure of 0.1 bar to 100 bar, more preferably at 1 to 10 bar.

By virtue of the complete encapsulation in a housing, the conveying device can also be used in apparatuses having high design pressures and/or high purity demands.

The conveying channel in the interior of the conveying device is not itself a pressurized component and can therefore be embodied in a material suitable for the respective material to be conveyed. As a result, it is possible to choose materials for housing, internal channel, compensators and magnets which are designed specifically for longevity and by which the product to be conveyed is not contaminated or is contaminated to a small degree. As a result, the outlay with respect to maintenance is very low.

The housing of the encapsulated conveying channel preferably comprises a metallic pipeline with weld-on connectors and a flange connection at the inlets and outlets.

The conveying channel within the encapsulated device is fixed to the housing in a movable fashion. The conveying channel is preferably a pipeline in the form of a closed pipe having openings at inlet and outlet, wherein the pipe is flexibly connected to the outer enclosure at at least one point. The flexible mounts can constitute, for example, springs, elastomeric (rubber) bands, movable holding strips or other flexible devices.

For reasons of product purity, inlet and outlet connectors are provided with plastic inliners. A strong permanent magnet is fixed to one of end of the plastic pipe. The magnet can be connected, for example, in a separate chamber fixed to the pipe, in order to avoid contamination of the interior space by the magnet. Particular preference is given to an embodiment wherein a strong cylindrical permanent magnet is welded into a plastic container fitted to the conveying pipe.

The freedom of movement within the chamber for the magnet should be dimensioned such that the permanent magnet on the one hand has a margin for play for its swaying movement, which causes the conveying channel to vibrate, but on the other hand does not permit free rotary movement of the magnet.

The swaying movement of the permanent magnet is excited by an external alternating electromagnetic field of a coil that is coupled to the permanent magnet.

The axis of the magnet has to be arranged perpendicularly to the coil axis (axis of the electromagnetic field). In order to protect the permanent magnet against abrasion as a result of the permanent swaying movements, the permanent magnet is preferably coated or welded into a jacket composed of high-grade steel.

All technically usable magnets can be used as materials for the permanent magnet. Magnets containing rare earths are preferred, and samarium-cobalt magnets are particularly preferred. The exact composition of the magnets and the magnetic force thereof are not crucial to the invention. In principle, the permanent magnet can have any desired forms, but a cylindrical form is preferably used. Magnets having a size ratio (height to diameter) of 1.3:1 are preferably used.

The magnet enclosure in which the permanent magnet is accommodated requires enough free space in order that the magnet can move freely in a swaying movement and in order that correct impulse transfer to the conveying pipe arises. The ratio of the cavity of the magnet enclosure to the magnet diameter is preferably 1.2:1 and the preferred height of the magnet chamber relative to the magnet height is 1.2:1.

The permanent magnet is preferably incorporated in an upright fashion. When an alternating field is applied, the permanent magnet attempts to center itself in the field and, during this rotary movement, transfers impulses to the wall of the magnet enclosure and thus to the conveying channel fixed thereto.

The throughput amount of silicon granules through the conveying device is set as an analog variable by way of the modulation of amplitude (coil current) and frequency of the alternating magnetic field of the coil by means of a frequency converter, for example. In this case, the frequency is tuned to the natural frequency of the conveying channel in the respective installation situation. By means of the choice of the corresponding magnet material, the dimensioning of the cavity diameter, the inclination of the inner conveying channel and the size of the permanent magnet, it is possible to define working ranges for different applications.

A single-phase magnetic field is used for the excitation of the magnet. In this case, a variable frequency of 0.1 to 1000 Hz is preferred, more preferably 5 to 100 Hz. The frequency is tuned to resonance in accordance with the installation conditions. By way of example, a frequency converter can be used for the tuning. The frequency of the swaying movement corresponds to the frequency of the excitation field.

For setting the required throughput amount in the conveying channel, the current amplitude can be varied in a continuous manner. This variation is preferably effected over a range of 0.1 to 100 A, more preferably in a range of 0.1 to 5 A.

The field strength results from the ampere-turns figure used and varies with the current intensity set for the required conveying amount.

FIG. 1 shows an embodiment of the method according to the invention. The conveying channel (2) is fitted in a pressuretight fashion within an enclosure (1). For the flexible connection of the internal conveying channel (2), the latter is connected at the entrance and exit flange by means of a flexible compensator (3). The conveying channel itself is likewise connected flexibly by means of a plurality of holding springs (7) within the enclosure (1). An enclosure (5) for a permanent magnet (4) is fitted to one end of the internal conveying channel (2). The permanent magnet is set in motion by an externally applied alternating field (6). As a result of the movement of the internal conveying channel (2), the silicon granules introduced through the feed opening (8) are moved forward as far as the opening for the product outlet (9).

It is also possible for a plurality of entrances and exits to be fitted to the conveying device, for example for a plurality of holding containers or for removing relatively small amounts of granules for sampling from the conveying path thereof.

Figure 2:
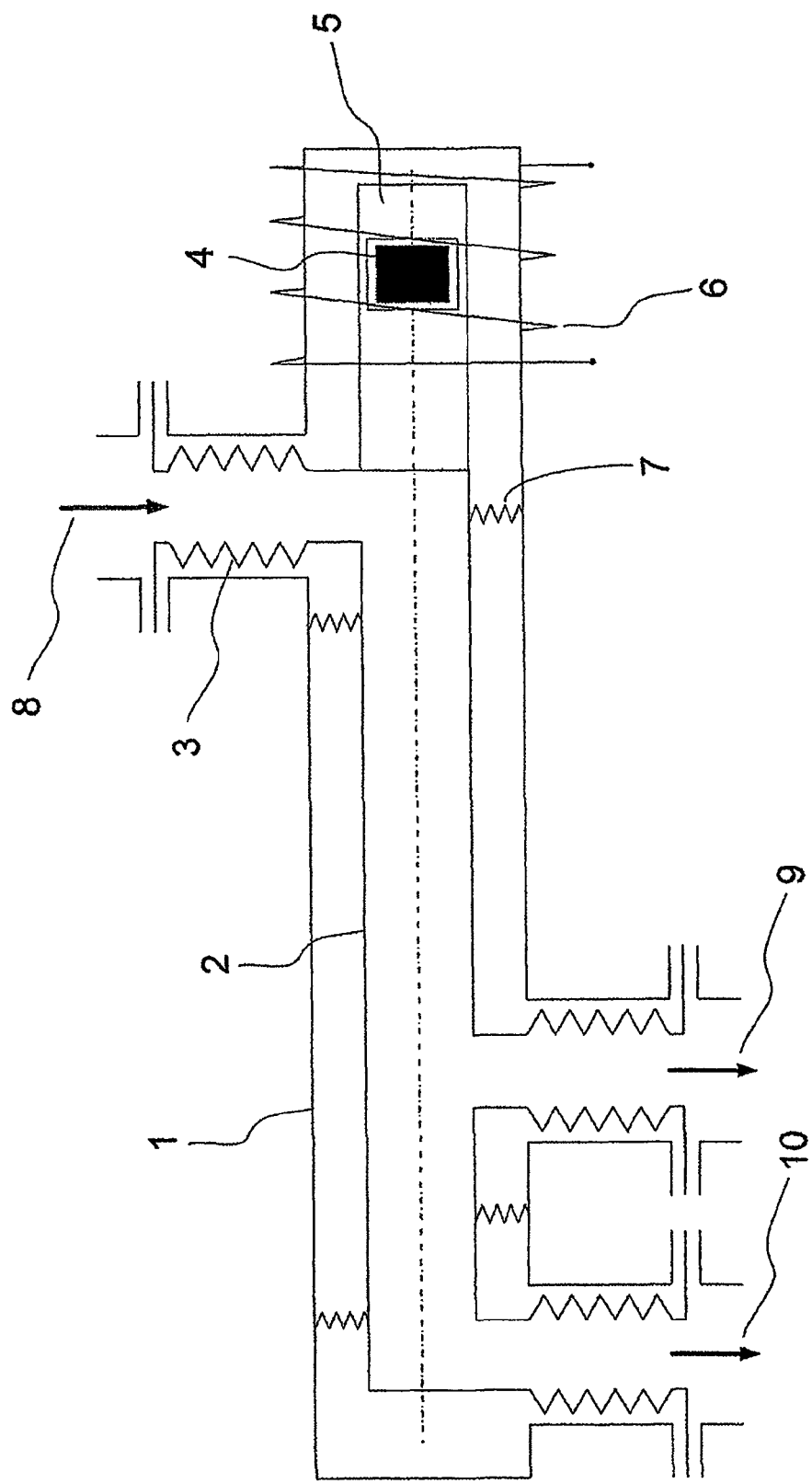
FIG. 2 illustrates a further embodiment of the invention.

As one particular embodiment of the method according to the invention, an encapsulated conveying device is used wherein an additional device for removing a product sample is possible (FIG. 2). In this case, two outlet connectors (9 and 10) are arranged one behind the other. As a result of the closing of a fitting below the first outlet (9), the material to be conveyed is backed up and blocks the outlet. The shaking movement of the channel conveys the material further to the second outlet (10), from which it then flows into the sample section. The sampling is ended by the reopening of the fitting below the first outlet.

The method according to the invention is suitable for almost every solid particle, but is particularly preferred for conveying high-purity silicon such as, for example, solar-grade silicon for the production of solar cells or hyper-pure silicon for the production of mono- or multicrystalline silicon crystals for the electrical industry.

The invention will be explained in greater detail on the basis of the following example.

EXAMPLE

The method according to the invention was performed in a conveying channel in accordance with FIG. 1. The enclosure (1) composed of high-grade steel had a diameter of 120 mm and a length of 1000 mm. The conveying pipe (2) was composed of a plastic pipe having a diameter of 50 mm and a length of 700 mm. The plastic enclosure for the permanent magnet had a diameter of 50 mm and a length of 100 mm. Flexible plastic compensators (3) were fitted between the inlet and outlet flange and the conveying pipe. The holding springs (7) were composed of metal and plastic. High-grade steel weld-on flanges were chosen as flanges in order to seal the device by means of DIN flange seals. For the external excitation field, a coil (6) was wound onto a cylinder and positioned on the outer pipe at the level of the permanent magnet (4). A cobalt-samarium magnet having an external diameter of 30 mm and a length of 40 mm in a high-grade steel sheath was used as the permanent magnet. The frequency of the swaying movement was varied between 0.1 and 70 Hz. In this case, it was possible to set transport of the material to be conveyed of from 0 to 100 kg/h in a continuously variable fashion.

The material to be conveyed was silicon granules having a high degree of purity (hyper-pure silicon for electronic and solar applications) and a grain size distribution of 20 µm to 1000 µm and average grain sizes of between 300 µm and 500 µm.

No contamination could be ascertained on the silicon granules and on the device itself after the granules had passed through the device according to the invention.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for conveying granulated silicon by means of horizontal and/or vertical movement of a conveying device having a conveying channel for silicon granules, wherein the conveying device is completely encapsulated with respect to the outside, comprising providing an encapsulated conveying device having a conveying channel, introducing solar grade and/or hyperpure elemental silicon granules into the conveying channel, exciting at least one permanent magnet fitted to the conveying device by means of an alternating electromagnetic field, the electromagnetic field being applied to the encapsulated device externally, the alternating electromagenetic field, swaying the conveying channel, imparting a forward movement of silicon granules and thereby conveying the silicon granules through the conveying device by means of said swaying movement into or out of a fluidized bed reactor.

2. The method of claim 1, wherein the permanent magnet is encapsulated in a metallic sleeve for stabilization.

3. The method of claim 2, wherein the pressure inside the encapsulated device is greater than atmospheric pressure and less than 100 bar.

4. The method of claim 1, wherein the throughput of silicon granules through the conveying device is established by modulation of at least one of an amplitude (coil current) and a frequency of the alternating electromagnetic field of the coil.

5. The method of claim 2, wherein the throughput of silicon granules through the conveying device is established by modulation of at least one of an amplitude (coil current) and a frequency of the alternating electromagnetic field of the coil.

6. The method of claim 4, wherein the modulation is effected by means of a frequency converter.

7. The method of claim 1, wherein a single-phase alternating magnetic field having a frequency of 0.1 to 1000 Hz is used for the excitation of the permanent magnet.

8. The method of claim 1, wherein, for establishing the throughput amount of silicon granules in the conveying channel, the current amplitude is regulated over a range of 0.1 to 100 A.

9. The method of claim 1, wherein a plurality of entrances and a plurality of exits are fitted to the conveying channel.

10. The method of claim 1, wherein the conveying channel is attached to a housing in moveable fashion, the housing encapsulating the conveying channel with respect to the outside environment.

11. The method of claim 1, wherein at least one end of the conveying channel is connected to an entry or exit flange by a flexible compensator.

12. The method of claim 1, further comprising selecting a silicon granule throughput, and adjusting the amplitude, frequency, or both amplitude and frequency of the alternating electromagnetic field to establish the selected silicon granule throughput.

13. The method of claim 1, wherein the conveying channel is contained within a housing, and the alternating electromagnetic field is applied external to the housing.

14. The method of claim 13, wherein the conveying channel is attached to a housing in moveable fashion, the housing encapsulating the conveying channel with respect to the outside environment.

15. The method of claim 13, wherein the conveying channel is contained within a housing, and the alternating electromagnetic field is applied external to the housing.

* * * * *